(12) United States Patent
Kung

(10) Patent No.: US 8,836,294 B2
(45) Date of Patent: Sep. 16, 2014

(54) SWITCHING REGULATOR AND CONTROL CIRCUIT AND METHOD THEREFOR

(75) Inventor: Nien-Hui Kung, Hsinchu (TW)

(73) Assignee: Richtek Technology Corporation, R.O.C., Chupei, Hsin-Chu (TW)

(*) Notice: Subject to any disclaimer, the term of this patent is extended or adjusted under 35 U.S.C. 154(b) by 632 days.

(21) Appl. No.: 13/162,519

(22) Filed: Jun. 16, 2011

(65) Prior Publication Data

US 2012/0319662 A1    Dec. 20, 2012

(51) Int. Cl.
*H02M 3/156*    (2006.01)
(52) U.S. Cl.
USPC .......................................... 323/222; 323/284
(58) Field of Classification Search
USPC ............................ 323/222, 225, 271, 282–290
See application file for complete search history.

(56) References Cited

U.S. PATENT DOCUMENTS

| 6,580,258 B2 | 6/2003 | Wilcox et al. |
| 6,674,274 B2* | 1/2004 | Hobrecht et al. ............. 323/285 |
| 7,652,945 B2* | 1/2010 | Chu et al. ...................... 365/226 |
| 7,714,556 B2* | 5/2010 | Chu et al. ...................... 323/282 |
| 7,940,596 B2* | 5/2011 | Chu et al. ...................... 365/226 |

* cited by examiner

*Primary Examiner* — Jessica Han
(74) *Attorney, Agent, or Firm* — Tung & Associates

(57) ABSTRACT

The present invention discloses a switching regulator, a control circuit and a control method therefor. The switching regulator comprises an upper gate switch, a lower gate switch, and an inductor connected to a switching node. When a current passing through the upper gate switch or the inductor is lower than a threshold, the lower gate switch is kept OFF until a next cycle, and during the cycle wherein the lower gate switch is OFF, the upper gate switch is turned ON for a period of time.

10 Claims, 5 Drawing Sheets

SWITCHING REGULATOR AND CONTROL CIRCUIT AND METHOD THEREFOR

BACKGROUND OF THE INVENTION

1. Field of Invention

The present invention relates to a switching regulator and a control circuit and a control method therefor, in particular to such switching regulator which is capable of avoiding current reverse flow, and a control circuit and a control method therefor.

2. Description of Related Art

Switching regulators are often used in power supply circuits for converting an AC or a DC voltage to a regulated voltage. A switching regulator typically includes a control circuit and a power stage, wherein the control circuit controls the power stage by pulse width modulation (PWM) or pulse frequency modulation (PFM), to regulate the output voltage.

There are many types of switching regulators, such as buck switching regulator, boost switching regulator, inverter switching regulator, and buck-boost switching regulator, etc. The above regulators also can be categorized into two types according to their circuit structure: synchronous and asynchronous types. A synchronous switching regulator includes two power transistor switches (a synchronous buck-boost switching regulator includes four power transistor switches), while an asynchronous switching regulator replaces one of the power transistor switches by a diode.

FIG. 1A shows a prior art buck switching regulator. The switching regulator 10 includes an up-gate power transistor 11 connected between an input voltage Vin and a switching node 15, and a low-gate power transistor 12 connected between the switching node 15 and ground GND. When the up-gate power transistor 11 is turned ON and the low-gate power transistor 12 is turned OFF, current I1 flows from the input Vin, through the up-gate power transistor 11 and the inductor L 13, to charge the capacitor Cout 14 and generate an output voltage Vout. When the up-gate power transistor 11 is turned OFF and the low-gate power transistor 12 is turned ON, in the beginning current I2 flows from the ground GND, through the low-gate power transistor 12 and the inductor L 13, to the capacitor Cout 14; the current I2 decreases along with time. Referring to FIG. 1B, because the low-gate power transistor 12 is conductive bi-directionally, after the current I2 decreases to 0, a reverse current I3 flows from the capacitor Cout 14, through the inductor L 13 and the low-gate power transistor 12, to the ground GND. That is, the capacitor Cout 14 discharges and this is inefficient. The currents I1, I2 and I3 flow through the inductor L 13 and therefore they are referred to as the inductor current IL. In addition, to maintain the level of the output voltage Vout, the up-gate and low-gate power transistors 11 and 12 keep switching even in light load or no load conditions, which induces switching loss.

To improve the efficiency of the aforementioned synchronous switching regulator in light load or no load conditions, U.S. Pat. No. 6,580,258 proposes a control circuit and a method wherein the up-gate and low-gate power transistors are both turned OFF for a short period of time when the inductor current is lower then a threshold level. The proposed control circuit and method detects whether the inductor current is lower then a threshold level when the up-gate power transistor is OFF and the low-gate power transistor is ON. If yes, the low-gate power transistor is immediately turned OFF. However, because the low-gate power transistor is first turned ON and then turned OFF if the threshold condition is met, the low-gate power transistor has to frequently switch and this induces more switching loss. Besides, if the threshold level is not set properly, the reverse current might still occur.

In view of the above, the present invention proposes a switching regulator capable of avoiding current reverse flow and reducing the switching operation of the power transistors, and a control circuit and a control method therefor.

SUMMARY OF THE INVENTION

An objective of the present invention is to provide a switching regulator capable of avoiding current reverse flow.

Another objective of the present invention is to provide a control circuit for a switching regulator, in particular for controlling the power transistors in the switching regulator.

Another objective of the present invention is to provide a method for controlling a switching regulator, in particular for controlling the power transistors in the switching regulator.

To achieve the foregoing objectives, the present invention provides a switching regulator, comprising: a power stage including an up-gate power transistor, a low-gate power transistor and an inductor, coupled with one another at a switching node; a pulse width modulation (PWM) signal generator for generating a PWM signal; a current sense circuit receiving a sense signal relating to a current flowing through the up-gate power transistor (up-gate current) or relating to a current flowing through the inductor (inductor current), and comparing the sense signal with a threshold to generate a low-gate OFF signal; and a driver circuit determining whether to control the low-gate power transistor according to the PWM signal or turning OFF the low-gate power transistor until a next cycle, according to the low-gate OFF signal.

In one embodiment, the current sense circuit includes: a peak detector receiving the sense signal relating to the up-gate current or the inductor current, and generating a peak signal indicating a peak of the up-gate current or the inductor current; and a comparator comparing the peak signal with the threshold to generate the low-gate OFF signal.

In another embodiment, the current sense circuit includes: a comparator comparing the sense signal relating to the up-gate current or the inductor current with the threshold to generate the low-gate OFF signal.

In another aspect, the present invention provides a control circuit for controlling an up-gate power transistor and a low-gate power transistor in a switching regulator, the up-gate power transistor, the low-gate power transistor and an inductor being coupled with one another at a switching node, the control circuit comprising: a PWM signal generator for generating a PWM signal; a current sense circuit receiving a sense signal relating to a current flowing through the up-gate power transistor or relating to a current flowing through the inductor, and comparing the sense signal with a threshold to generate a low-gate OFF signal; and a driver circuit determining whether to control the low-gate power transistor according to the PWM signal or turning OFF the low-gate power transistor until a next cycle, according to the low-gate OFF signal.

In another aspect, the present invention provides a method for controlling an up-gate power transistor and a low-gate power transistor in a switching regulator, the up-gate power transistor, the low-gate power transistor and an inductor being coupled with one another at a switching node, the method comprising: sensing a current flowing through the up-gate power transistor or a current flowing through the inductor; and when the up-gate current or the inductor current is lower than a threshold, turning OFF the low-gate power transistor until a next cycle, but keeping the up-gate power transistor ON for a period of time when the low-gate power transistor is OFF.

The present invention can be applied to buck, boost, inverter, buck-boost or inverting boost switching regulators.

The switching regulator according to the present invention includes at least two operation modes: in a synchronous mode, the up-gate and low-gate power transistors being turned ON complementarily in one cycle of the PWM signal; and in an asynchronous mode, only the up-gate power transistor being turned ON while the low-gate power transistor being always OFF in one cycle of the PWM signal.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustration only, to show the interrelations between the circuits/devices, but not drawn according to actual scale.

Figure 1A:
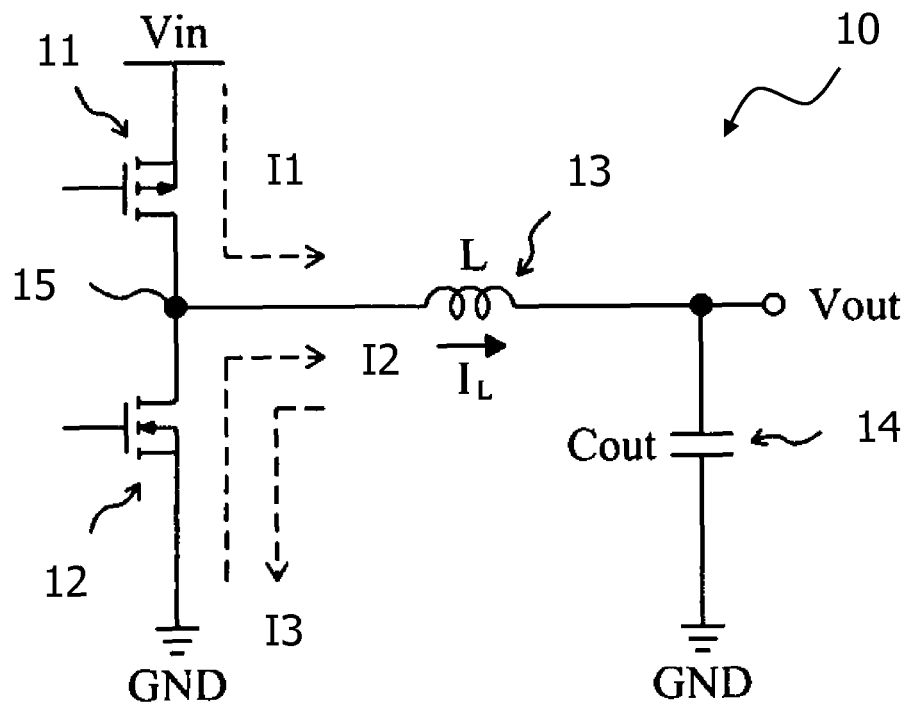
FIG. 1A shows a prior art synchronous switching regulator.
Figure 1B:
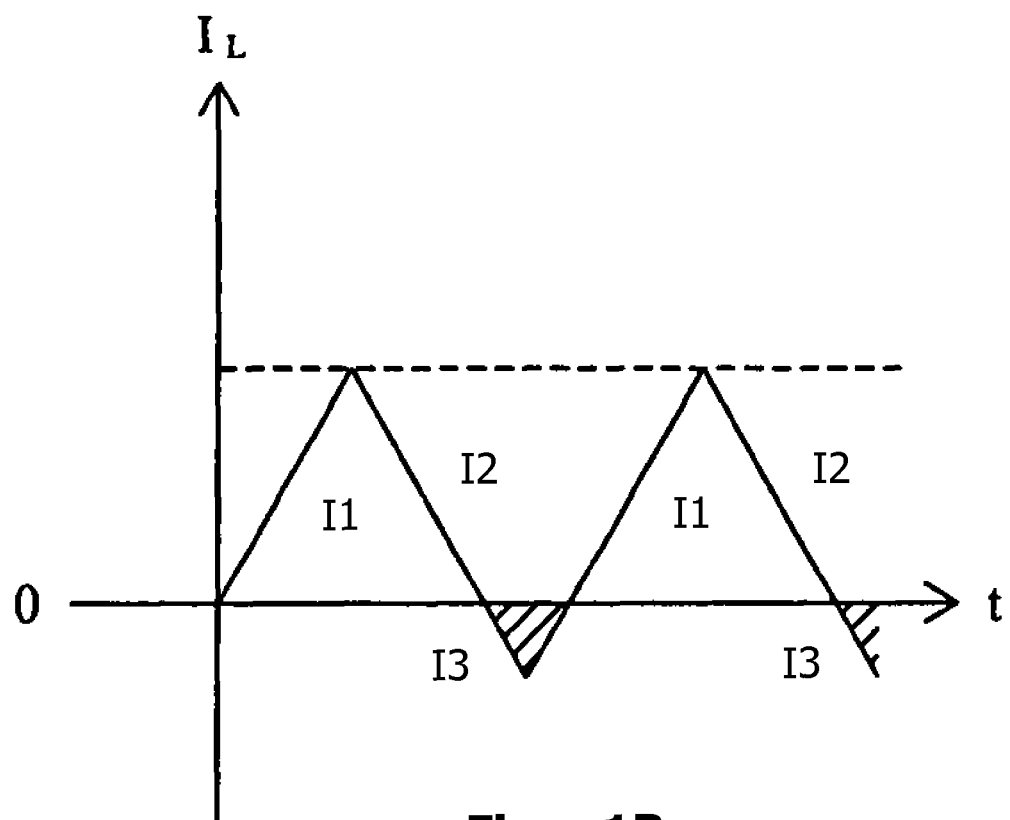
FIG. 1B shows the inductor current waveform of the prior art synchronous switching regulator.
Figure 2:
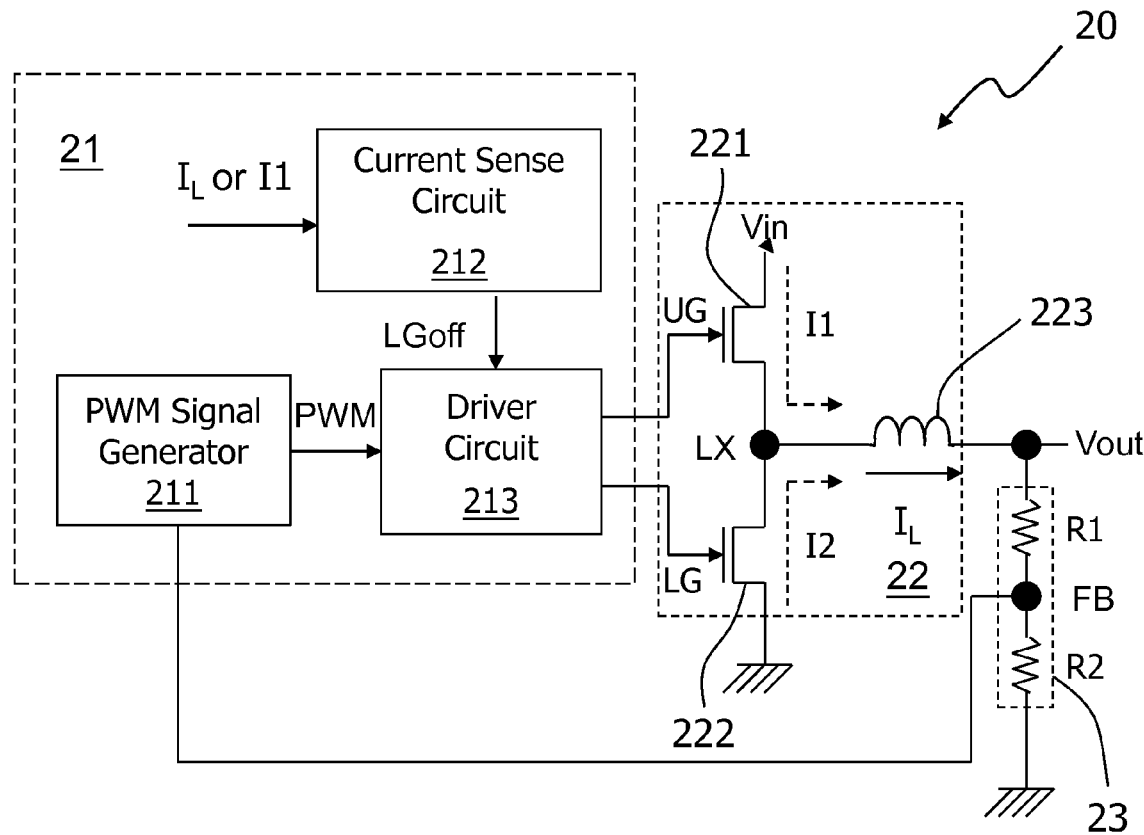
FIG. 2 shows an embodiment of the switching regulator according to the present invention.

Please refer to FIG. 2 for a first embodiment of a switching regulator according to the present invention. The switching regulator 20 includes a control circuit 21, a power stage 22 and a feedback circuit 23. The power stage 22 includes an up-gate power transistor 221, a low-gate power transistor 222, and an inductor 223, wherein the up-gate and low-gate power transistors 221 and 222 are connected with each other through a switching node LX, and their operations are controlled by the control circuit 21. The control circuit 21 generates an up-gate signal UG and a low-gate signal LG according to a feedback signal FB obtained from the output Vout, to control the operations of the up-gate and low-gate power transistors 221 and 222 such that power is transmitted from the input Vin to the output Vout. The feedback circuit 23 for example includes resistors R1 and R2, to divide the output voltage Vout and generate a dividend voltage which is the feedback signal FB. The power stage 22 for example can be, but is not limited to, a buck, boost, inverter, buck-boost or inverter-boost switching regulator; the spirit of the present invention covers any switching regulator which includes at least two switching devices and one inductor.

Figure 3A:
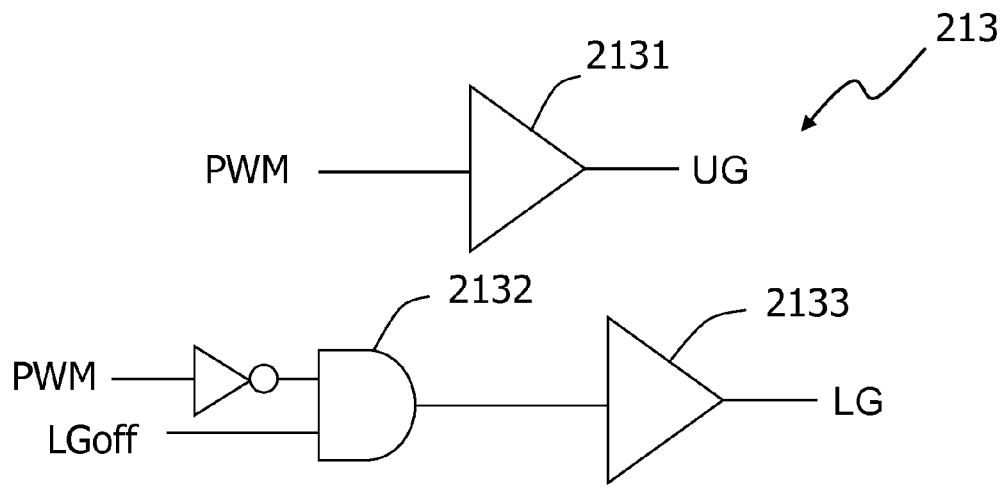
FIGS. 3A-3B show two embodiments of the driver circuit according to the present invention.
Figure 3B:
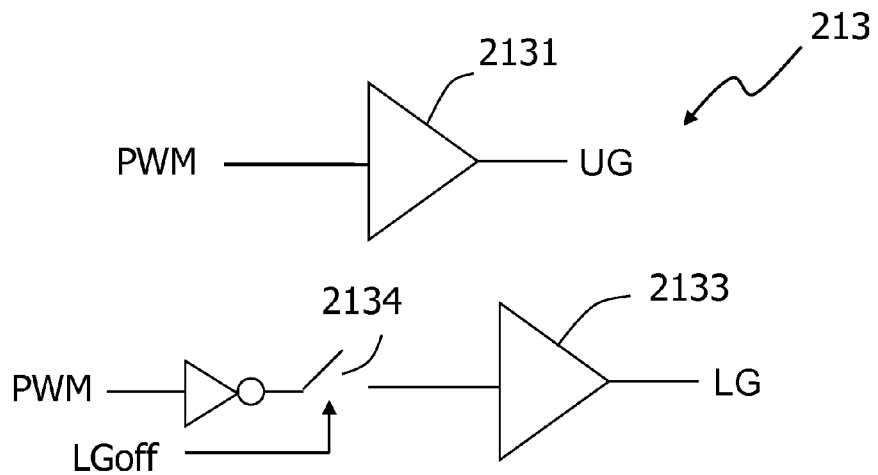

In this embodiment, the control circuit 21 includes a PWM signal generator 211, a current sense circuit 212 and a driver circuit 213. The PWM signal generator 211 receives the feedback signal FB, and generates the PWM signal (PWM) according to the feedback signal FB. (Note that, although the signal is referred to as "PWM signal", the control mechanism is not limited to pulse width modulation but may be pulse frequency modulation instead.) The current sense circuit 212 receives a sense signal relating to the inductor current $I_L$ or relating to the current I1 flowing through the up-gate power transistor 221, and when the inductor current $I_L$ or the current I1 is lower than a threshold, the current sense circuit 212 changes the level of its output signal LGoff (hereinafter referred to as the "low-gate OFF signal"). In one embodiment, the driver circuit 213 is as shown in FIG. 3A, wherein the PWM signal passes through a first driver gate 2131 to generate an up-gate signal UG having a proper driving level, and an inverted signal of the PWM signal passes through a logic gate 2132 and a second driver gate 2133 to generate a low-gate signal LG having a proper driving level. When the low-gate OFF signal LGoff indicates that the inductor current $I_L$ or the current I1 is lower than the threshold, the low-gate signal LG turns OFF the low-gate power transistor 222. Depending on how the low-gate OFF signal LGoff is generated, how the PWM signal is inputted to the logic gate 2132, and the conductive types of the up-gate and low-gate power transistors 221 and 222, the logic gate 2132 may be other types of logic gates instead of the AND gate shown in the figure. Or, in another embodiment, the driver circuit 213 is as shown in FIG. 3B, wherein the low-gate OFF signal LGoff controls a switch 2134, and when the signal LGoff indicates that the inductor current $I_L$ or the current I1 is lower than the threshold, the switch 2134 is turned OFF. This embodiment also achieves the same effect as the previous embodiment.

Figure 4:
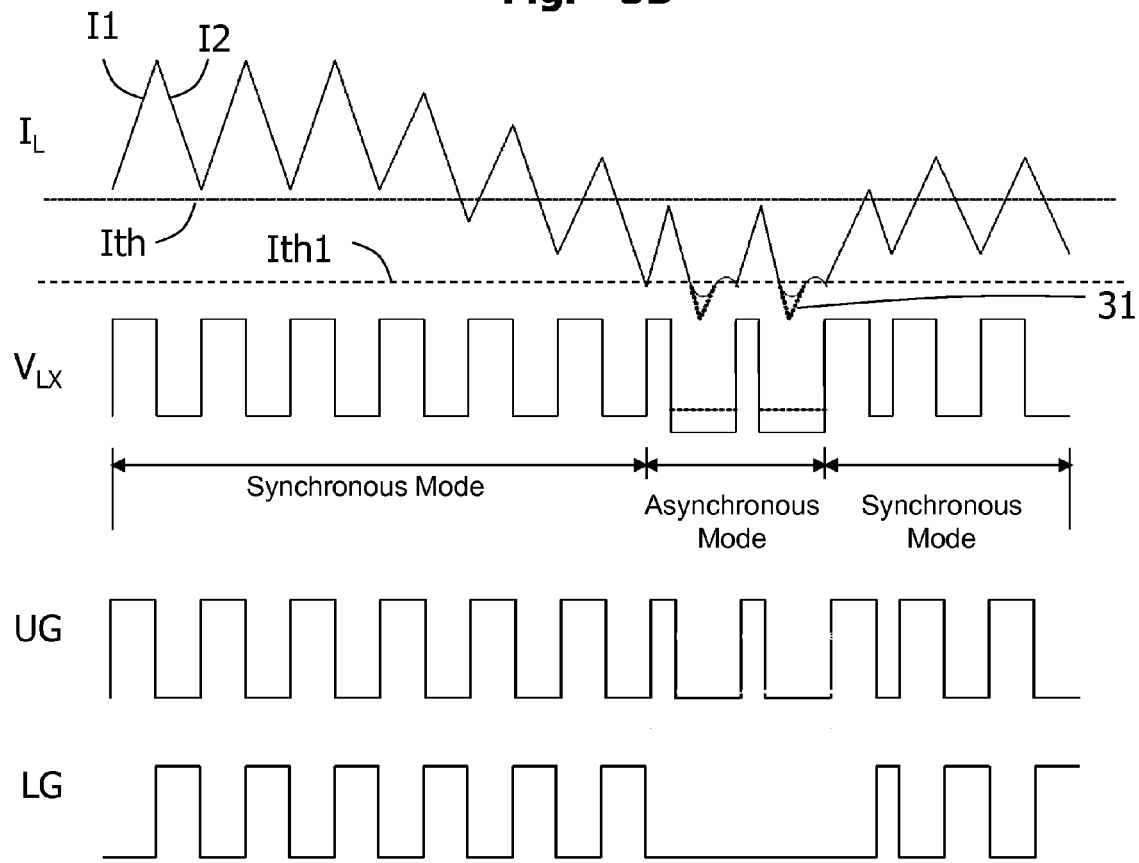
FIG. 4 shows the signal waveforms at several nodes of the switching regulator according to the present invention.

The effect of the above arrangement can be more clearly understood with reference to FIG. 4, which shows signal waveforms at several nodes of the switching regulator according to the present invention. In one cycle of the PWM signal, the inductor current $I_L$ includes an increasing phase (the current I1) and a decreasing phase (the current I2, which is the current flowing through the low-gate power transistor 222). If the peak of the inductor current $I_L$ is not lower than the threshold Ith, the up-gate signal UG and the low-gate signal LG will respectively turn ON the up-gate and low-gate power transistors 221 and 222 complementarily, which is the synchronous mode. In this synchronous mode, the voltage VLx at the switching node LX will switch between a high level and a low level regularly. On the other hand, if in a cycle, the peak of the inductor current $I_L$ is lower than the threshold Ith, the low-gate power transistor 222 will be always OFF in this cycle, which is the asynchronous mode. In the asynchronous mode, the current I2 flows through the body diode of the low-gate power transistor 222. In comparison with the prior art described in the background, the prior art detects whether the inductor current $I_L$ is close to zero after the low-gate power transistor 222 is already turned ON, and turns OFF the low-gate power transistor 222 accordingly. The present invention is more advantageous because the present invention avoids frequent switching of the low-gate power transistor 222, while also avoids current reverse flow effectively.

More specifically, referring to FIG. 4, the peak of the inductor current $I_L$ is lower than the threshold Ith in two cycles of the asynchronous mode, so the low-gate signal LG is kept at a low level which keeps the low-gate power transistor 222 OFF. As such, the valley of the inductor current $I_L$ is improved as shown by the sold curves in the figure, to avoid current reverse flow. On the other hand, in the prior art, current reverse flow might still occur as shown by the dot line 31 in the figure. When the current flows through the body diode of the low-gate power transistor 222, it indicates that the voltage level of the switching node LX is lower than the lower end of the low-gate power transistor 222, so the low level of the voltage VLx in the asynchronous mode is lower than the low level of the voltage VLx in the synchronous mode.

Figure 5A:
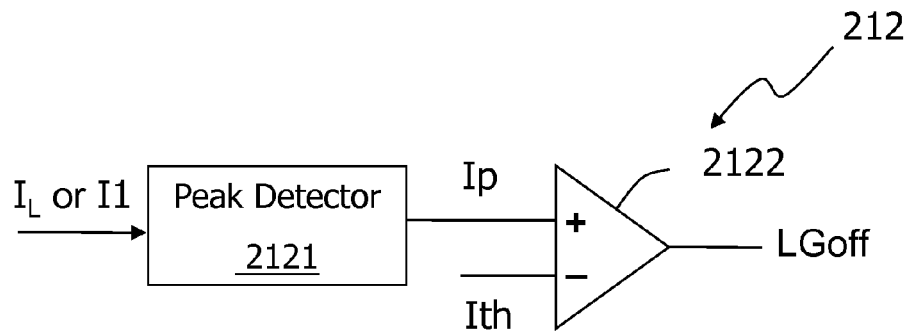
FIGS. 5A-5B show two embodiments of the current sense circuit according to the present invention.

FIG. 5A shows an embodiment of the current sense circuit according to the present invention. Depending on the level of the threshold Ith, if the threshold Ith is set as the level shown in FIG. 4, it means that the threshold Ith should be compared with the peak of the inductor current $I_L$, so the current sense circuit 212 preferably includes a peak detector 2121 which detects the peak of the inductor current $I_L$ or the current I1 and outputs the peak Ip to a comparator 2122. The comparator 2122 compares the peak Ip with the threshold Ith, and generates the low-gate OFF signal LGoff which is sent to the driver circuit 213.

Figure 5B:
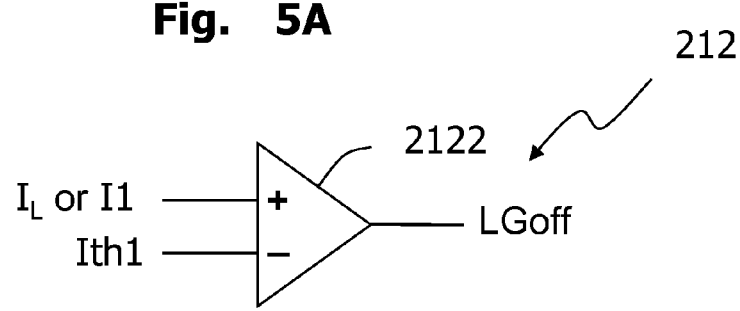

Obviously, the threshold can be set to a different level and the circuit can be correspondingly modified, still achieving the same function and effect. For example, the threshold can be set to the threshold Ith1 as shown in FIG. 4; in this case, it does not need to detect the peak of the inductor current $I_L$ or the current I1, and the threshold Ith1 can be compared with the inductor current $I_L$ or the current I1 directly. That is, the peak detector 2121 can be omitted, as shown in FIG. 5B.

Figure 6:
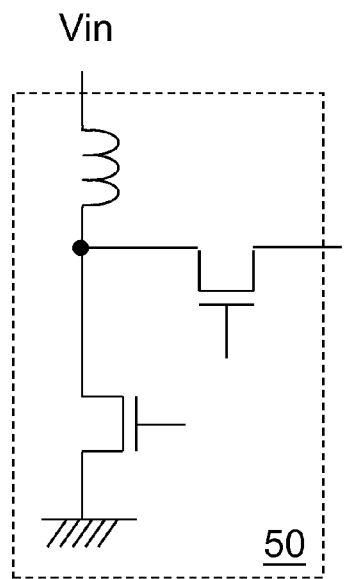
FIG. 6 is a schematic circuit diagram showing a boost switching regulator.
Figure 7:
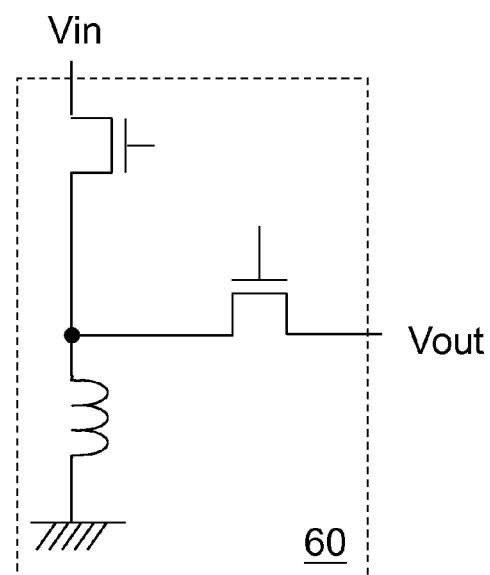
FIG. 7 is a schematic circuit diagram showing an inverter switching regulator.
Figure 8:
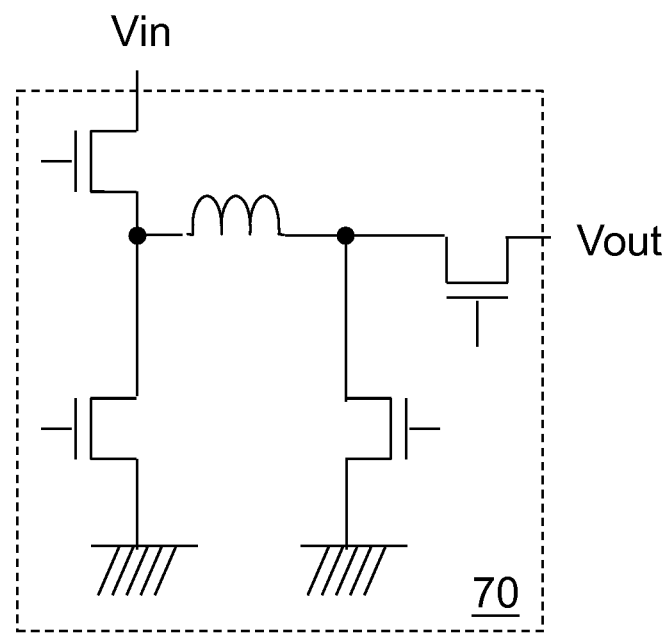
FIG. 8 is a schematic circuit diagram showing a buck-boost switching regulator.
Figure 9:
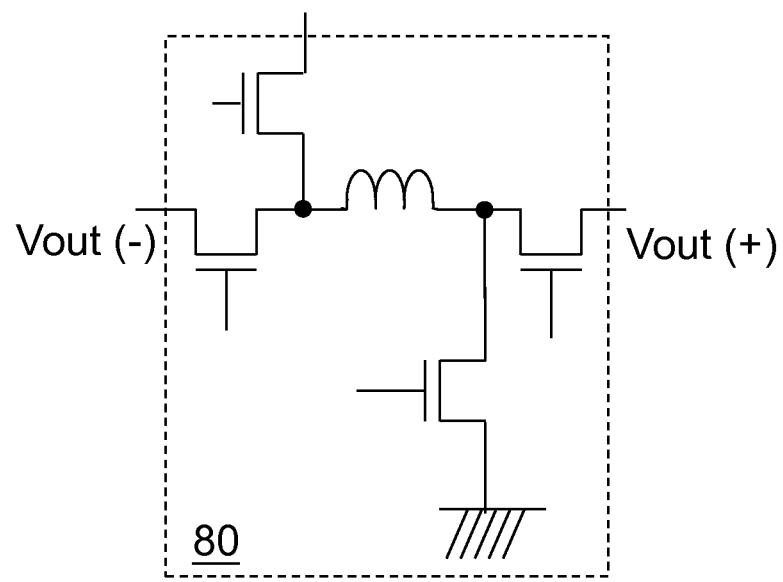
FIG. 9 is a schematic circuit diagram showing an inverter-boost switching regulator.

The present invention is not limited to being applied to the buck switching regulator 20 as shown in FIG. 2. It can be applied to the boost switching regulator 50 shown in FIG. 6, the inverter switching regulator 60 shown in FIG. 7, the buck-boost switching regulator 70 shown in FIG. 8, or the inverter-boost switching regulator 80 shown in FIG. 9.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positive and negative input terminals of a comparator can be interchanged, with corresponding modification to other circuits processing the input and output signals of the comparator. As another example, a circuit or device can be interposed between two circuits or devices shown to be in direct connection in the embodiments, as long as such interposed circuit or device does not substantially affect the primary function of the complete circuitry. Thus, the present invention should cover all such and other modifications and variations, which should be interpreted to fall within the scope of the following claims and their equivalents.

What is claimed is:

1. A switching regulator, comprising:
a power stage including an up-gate power transistor, a low-gate power transistor and an inductor, coupled with one another at a switching node;
a pulse width modulation (PWM) signal generator for generating a PWM signal;
a current sense circuit receiving a sense signal relating to a current flowing through the up-gate power transistor (up-gate current) or relating to a current flowing through the inductor (inductor current), and comparing the sense signal with a threshold to generate a low-gate OFF signal; and
a driver circuit determining whether to control the low-gate power transistor according to the PWM signal or turning OFF the low-gate power transistor in the present cycle until a next cycle, according to the low-gate OFF signal, wherein when the low-gate power transistor is turned OFF until a next cycle according to the low-gate OFF signal, the up-gate power transistor is controlled according to the PWM signal in the present cycle.

2. The switching regulator of claim 1, wherein the current sense circuit includes:
a peak detector receiving the sense signal relating to the up-gate current or the inductor current, and generating a peak signal indicating a peak of the up-gate current or the inductor current; and
a comparator comparing the peak signal with the threshold to generate the low-gate OFF signal.

3. The switching regulator of claim 1, wherein the current sense circuit includes: a comparator comparing the sense signal relating to the up-gate current or the inductor current with the threshold to generate the low-gate OFF signal.

4. The switching regulator of claim 1, wherein switching regulator operates in at least two modes: in a synchronous mode, the up-gate and low-gate power transistors being turned ON complementarily in one cycle of the PWM signal; and in an asynchronous mode, only the up-gate power transistor being turned ON while the low-gate power transistor being always OFF in one cycle of the PWM signal.

5. A control circuit for controlling an up-gate power transistor and a low-gate power transistor in a switching regulator, the up-gate power transistor, the low-gate power transistor and an inductor being coupled with one another at a switching node, the control circuit comprising:
a pulse width modulation (PWM) signal generator for generating a PWM signal;
a current sense circuit receiving a sense signal relating to a current flowing through the up-gate power transistor (up-gate current) or relating to a current flowing through the inductor (inductor current), and comparing the sense signal with a threshold to generate a low-gate OFF signal; and
a driver circuit determining whether to control the low-gate power transistor according to the PWM signal or turning OFF the low-gate power transistor in the present cycle until a next cycle, according to the low-gate OFF signal, wherein when the low-gate power transistor is turned OFF until a next cycle according to the low-gate OFF signal, the up-gate power transistor is controlled according to the PWM signal in the present cycle.

6. The control circuit of claim 5, wherein the current sense circuit includes:
a peak detector receiving the sense signal relating to the up-gate current or the inductor current, and generating a peak signal indicating a peak of the up-gate current or the inductor current; and
a comparator comparing the peak signal with the threshold to generate the low-gate OFF signal.

7. The switching regulator of claim 5, wherein the current sense circuit includes: a comparator comparing the sense signal relating to the up-gate current or the inductor current with the threshold to generate the low-gate OFF signal.

8. A method for controlling an up-gate power transistor and a low-gate power transistor in a switching regulator, the up-gate power transistor, the low-gate power transistor and an inductor being coupled with one another at a switching node, the method comprising:
sensing a current flowing through the up-gate power transistor (up-gate current) or a current flowing through the inductor (inductor current); and
when the up-gate current or the inductor current is lower than a threshold, turning OFF the low-gate power transistor until a next cycle, but keeping the up-gate power transistor ON for a period of time when the low-gate power transistor is OFF.

9. The method of claim 8, further comprising:

Detecting a peak of the up-gate current or the inductor current; and comparing the peak with the threshold.

10. The method of claim 8, wherein when the up-gate current or the inductor current is not lower than the threshold, turning ON the up-gate and low-gate power transistors complementarily in one cycle; and when the up-gate current or the inductor current is lower than the threshold, only turning ON the up-gate power transistor while the low-gate power transistor being always OFF in one cycle.

* * * * *